M. L. HUNKER.
EAVES TROUGH FORMING MACHINE.
APPLICATION FILED JUNE 21, 1920.

1,377,252.

Patented May 10, 1921.

WITNESSES.
W. B. Wood
Thos. J. Rudge.

INVENTOR.
M. L. Hunker.
BY
H. E. Dunlap
ATTORNEY.

M. L. HUNKER.
EAVES TROUGH FORMING MACHINE.
APPLICATION FILED JUNE 21, 1920.
1,377,252.
Patented May 10, 1921.
5 SHEETS—SHEET 2.
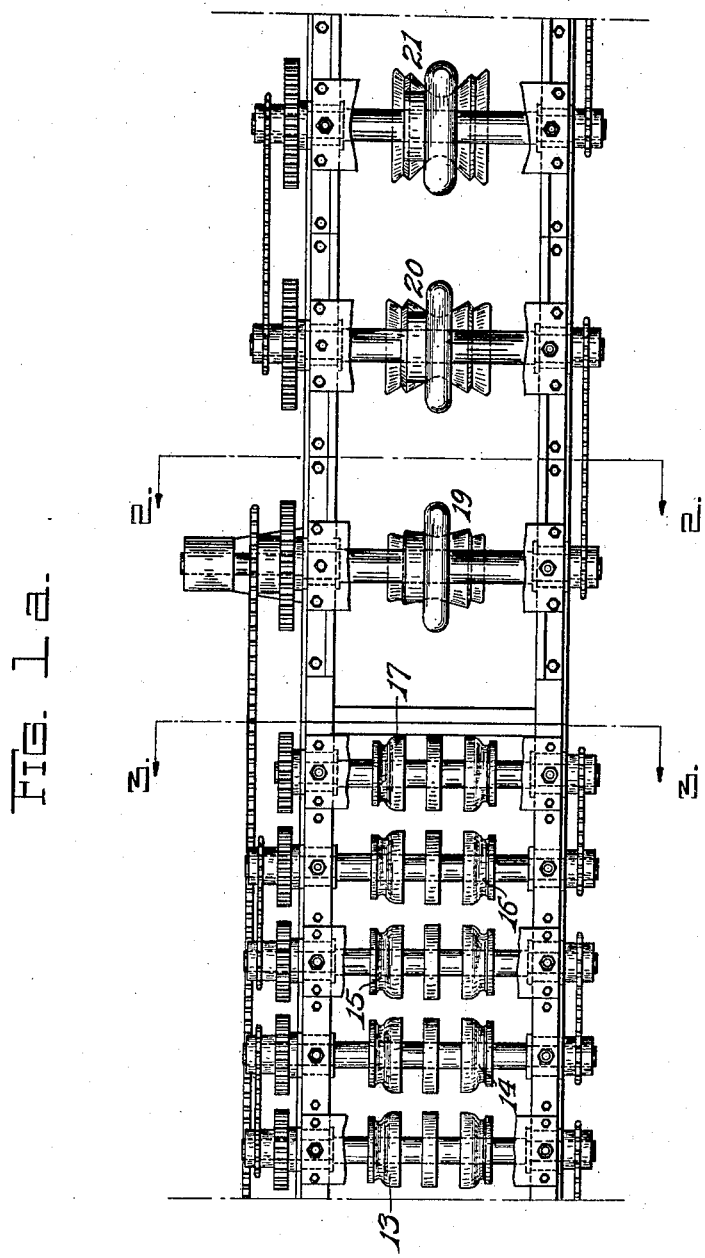
WITNESSES.
W. B. Wood
Thos. J. Rudge.
INVENTOR.
M. L. Hunker.
BY
N. E. Dunlap
ATTORNEY.

M. L. HUNKER.
EAVES TROUGH FORMING MACHINE.
APPLICATION FILED JUNE 21, 1920.
1,377,252.
Patented May 10, 1921.
5 SHEETS—SHEET 3.
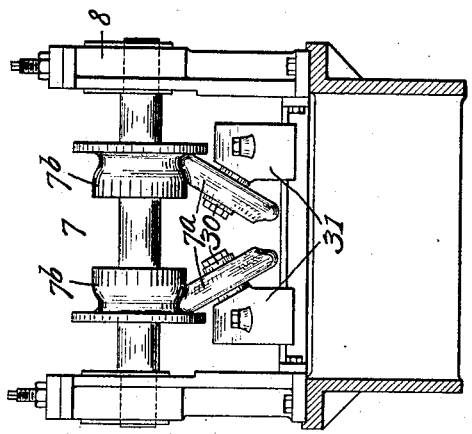
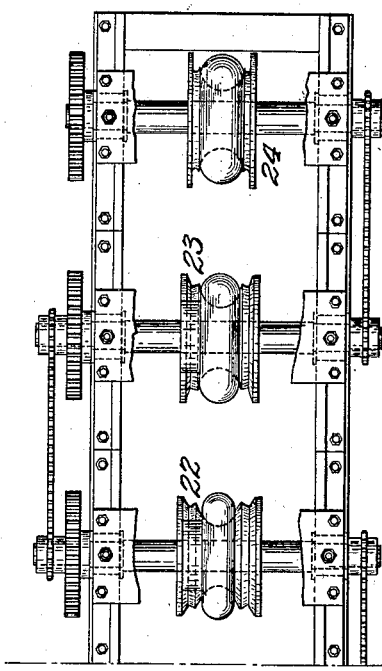

M. L. HUNKER.
EAVES TROUGH FORMING MACHINE.
APPLICATION FILED JUNE 21, 1920.

1,377,252.

Patented May 10, 1921.
5 SHEETS—SHEET 4.

WITNESSES.
W. B. Wood
Thos. J. Rudge.

INVENTOR.
M. L. Hunker.
BY
N. E. Dunlap,
ATTORNEY.

M. L. HUNKER.
EAVES TROUGH FORMING MACHINE.
APPLICATION FILED JUNE 21, 1920.
1,377,252.
Patented May 10, 1921.
5 SHEETS—SHEET 5.
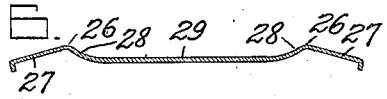
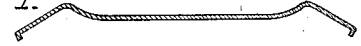
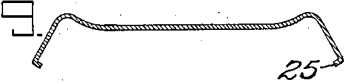
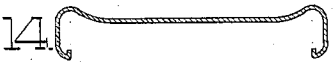
WITNESSES.
W. B. Wood
Thos. J. Rudge.
INVENTOR.
M. L. Hunker.
BY
N. E. Dunlap
ATTORNEY.

UNITED STATES PATENT OFFICE.

MARTIN L. HUNKER, OF WHEELING, WEST VIRGINIA, ASSIGNOR TO WHITAKER-GLESSNER COMPANY, A CORPORATION OF WEST VIRGINIA.

EAVES-TROUGH-FORMING MACHINE.

1,377,252.    Specification of Letters Patent.    Patented May 10, 1921.

Application filed June 21, 1920. Serial No. 390,402.

*To all whom it may concern:*

Be it known that I, MARTIN L. HUNKER, a citizen of the United States of America, and resident of Wheeling, county of Ohio, and State of West Virginia, have invented certain new and useful Improvements in Eaves-Trough-Forming Machines, of which the following is a specification.

This invention relates to a machine for the manufacture of sheet metal eaves troughs, and it has for its primary object the provision of a machine wherein a sheet metal blank is acted upon by forming dies or rolls which successively operate upon the blank for producing in a step by step sequence a plurality of graduated shaping bends whereby said blank is gradually developed into the definite eaves-trough shape desired.

A further important object is to provide a machine for forming eaves troughs and articles of like arcuate cross-sectional form, in which the sequence of operations performed upon the blank is such that the commonly-encountered tendency of the finished product to present edges or beads having an irregular undulatory, or wavy, form is completely obviated so that a perfect straight-backed trough is produced.

By way of explanation, it may here be stated that, in manufacturing eaves troughs by heretofore prevailing methods, it has been the universal practice to shape the body of the trough by a succession of pressing or rolling operations during which the lateral edges or beads of the blank are rigidly held and in which the entire body portion is at each operation received between and tightly gripped by the coöperating forming dies or rolls. Due to the fact that the lateral edges or beads are held rigidly and that the upper and lower dies or rolls seat in coöperative gripping relation to the blank throughout the entire opposite surfaces of the latter from the beginning to the end of the trough forming operations, as aforesaid, the metal of the blank is so confined that free and even distribution or "flow" thereof during the successive operations is rendered impossible, and consequently, the edges of the trough have an undulatory, wave-like form. This is in a measure obviated or remedied by such commonly employed expedients as forming corrugations, crimps, angles, and the like in the edges of the trough.

The present invention makes provision for the production of a trough which is devoid both of undulatory edges and the means or expedients whereby the formation of such edges is prevented—that is, a trough of the even and regular form termed "straight-backed."

In describing the invention indicated, reference is herein had to the accompanying drawings in which—

Figures 1, 1$^a$ and 1$^b$ together illustrate a top plan view of the invention;

Fig. 4 is a similar section on line 4—4 of Fig. 1, showing the rolls by which is performed the final operation in the formation of a marginal flange which is later developed to form a lateral roll or bead; and—

Figure 1:
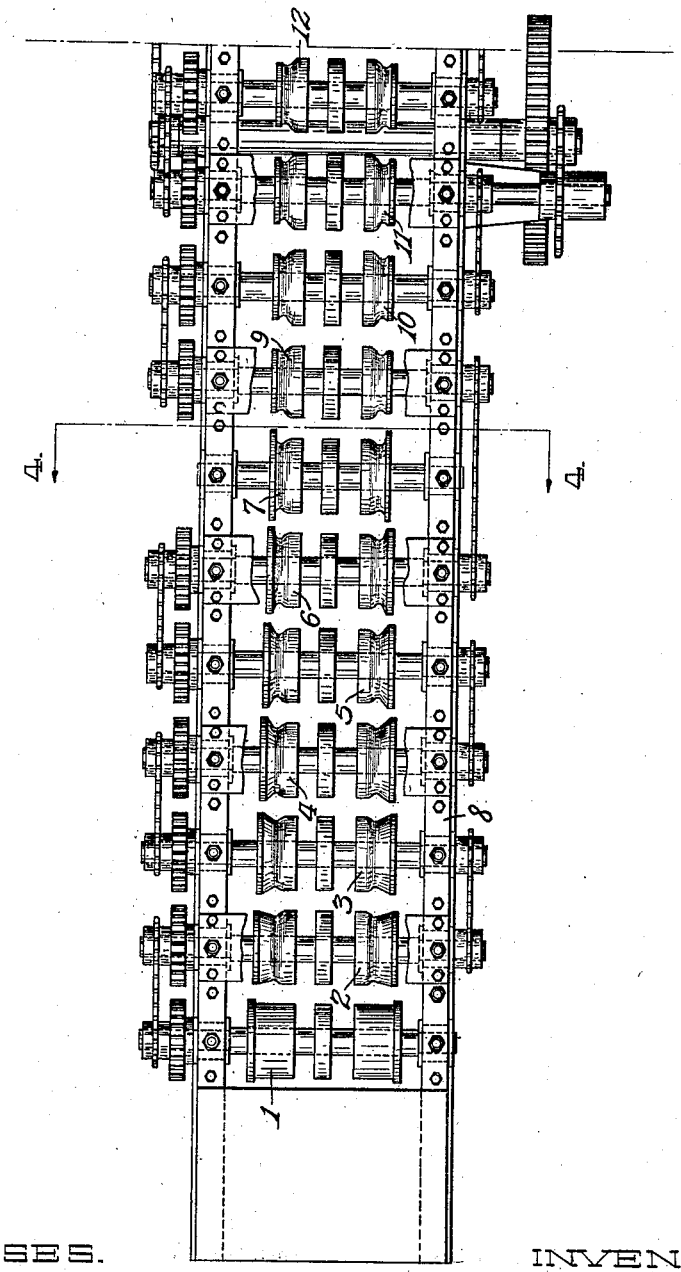
Figure 3:
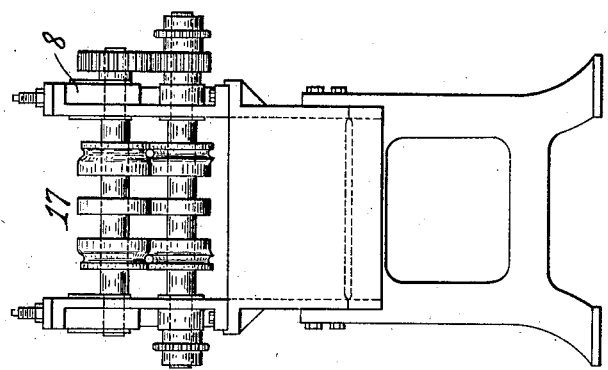
Fig. 3 is a similar section on line 3—3 of Fig. 1$^a$, showing the last set of the bead-forming series of rolls.

Figs. 5 to 26, inclusive, illustrate the successive shapes imparted to the metal blank by the various shaping rolls in the development of the product.

Referring to said drawings, a plurality of sets of coöperating flanging rollers indicated by the numerals 1, 2, 3, 4, 5, 6 and 7 are journaled in horizontally alined relation upon the front end of a table or frame 8, said rollers constituting a series whereby a plain sheet metal blank is successively operated upon for producing a partial or preliminary formation of the product, in which marginal flanges are disposed at right angles to the body of the blank, as shown in Fig. 11. A second series of sets of rollers designated 9, 10, 11, 12, 13, 14, 15, 16 and 17 disposed in line with and in advance of the rollers constituting the first series is journaled on said table, said rollers being graduated and designed to operate upon the marginal flanges of the blank for forming the lateral beads 18 of the finished product depicted in Fig. 26, said second series serving to successively, or in step by step sequence, impart to the blank the variations in form shown in Figs. 12 to 20, inclusive. A third series of sets of rollers designated 19, 20, 21, 22, 23 and 24 is arranged to operate upon the beaded blank to complete the production of the finished article by bending the body of the blank into trough shape by a succession of graduated steps illustrated in Figs. 21 to 26, inclusive.

The first operation performed on the plain sheet as it enters the machine between the set of rollers 1 is the formation of downturned right-angle terminal flanges 25 along the lateral edges of the sheet, as shown in Fig. 5, said flanges being of narrow width and designed, without further shaping, to constitute the inner locks of the lateral beads of the finished product.

The second operation, or that which follows in sequence the formation of the terminal flanges, is one which forms an important feature of the present invention, being essential to the production of a perfectly formed trough. This operation performed by the set 2 of rollers consists in producing bends 26 in the blank at points located inward an appropriate distance from the terminal flanges 25 for forming marginal flange portions 27 having very slight downward inclinations, and at the same time in forcing the body, or that portion of the blank which lies between said bends 26, downward into the form illustrated in Fig. 6 which form is preserved intact throughout the various successive steps constituting the terminal-flange bending operations and the bead-forming operations. This slight downward bending or dishing of the body produces contiguous to each bend 26 a gradual curvature, indicated at 28, which is preserved throughout and appears in the finished product. The purpose had in view in producing the curves 28 as an initial step in the shaping of the blank will hereinafter be made apparent.

The next four sets, 3, 4, 5 and 6, of the flanging rollers successively act upon the blank to gradually increase the inclination of the marginal flanges 27 until, emerging from between the rollers 6, said flanges occupy the sharply inclined positions shown in Fig. 10. From the last mentioned rollers the blank passes to and through the final set 7 of flanging rollers, whereby the flanges 27 are turned into positions at right angles to the original plane of the sheet or at right angles to the plane of the plain horizontal portion 29 of the blank body which lies intermediate the curves 28. Said final set 7 of flanging rollers differs from the preceding rollers in that it consists of inclined lower roller members 7a associated with upright upper roller members 7b and disposed in underlying coöperative relation to the latter. Said rollers 7a are journaled upon stub-shafts 30 mounted in supporting blocks 31 and disposed at a suitable angle of inclination. The arrangement of said rollers 7a as described makes provision for finally disposing the marginal flanges 27 at direct right angles to the plane of the body portion 29 without the presentation of any obstruction in the way of the terminal flange 25.

The rollers designated 9 to 17, inclusive, receive the blank which passes from the final set 7 of flanging rollers and successively operate upon the marginal flanges 27 for forming the lateral beads 18 shown in Figs. 20 to 26, inclusive, the various successive steps performed by the nine sets of graduated rollers in the series of beading rollers being shown in the nine figures of the drawings, Figs. 12 to 20, inclusive.

Passing from the last set 17 of the beading rollers, the blank enters the first set 19 of the third, or trough-forming, series of rollers which are graduated so that the body 29 of the blank will be successively operated upon for gradually forming the regularly curved arcuate trough shown in Fig. 26, the successive steps performed by the six sets of rollers in said series being depicted in Figs. 21 to 26, inclusive.

Figure 2:
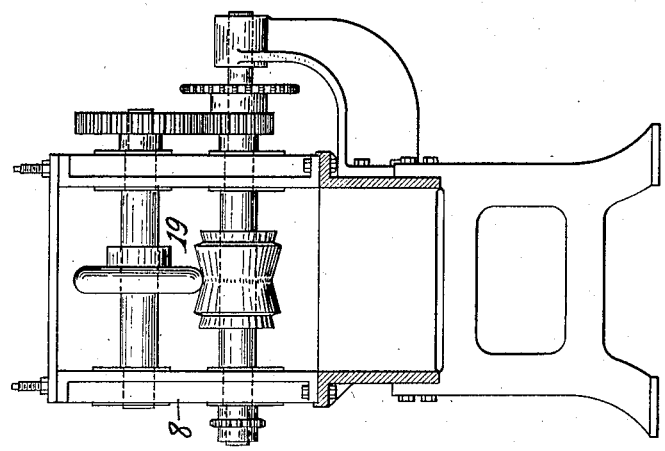
Fig. 2 is a transverse section on line 2—2 of Fig. 1$^a$, showing the first set of the body-shaping series of rolls.

To the end that the blank body shall be developed from the approximately plain form shown in Fig. 20 to the final semi-circular trough shape shown in Fig. 26, which development involves a substantial reduction of the distance between the opposite edges or beads, the trough-forming rollers are so graduated that the development shall be accomplished gradually, or without such abrupt flexure as would result in permanent distortion of the metal of the blank. Further, the present invention contemplates the requirement that the development shall begin at a point midway between the edges of the blank and thence proceed gradually outward in opposite directions until the finished shape is reached, and that, in carrying out the development, the greatest possible freedom shall be afforded the metal of the blank to adjust itself to the shaping pressures applied. Thus, each of the upper rollers of the trough-forming series has a width no greater than is necessary to produce the depression of the metal to the extent desired, while each of the lower rollers conforms to the shape of the portion of the blank which rests thereon. As shown in Figs. 1a and 2, the upper roller of the first set 19 is of extremely narrow width and coöperates with the lower roller to produce in the blank body 29 a central longitudinal downwardly pressed angular bend indicated at 32 in Fig. 21. Each succeeding upper roller of the series has an arcuately curved periphery and is of relatively increased width and acts to depress the central portion of the blank body to a greater depth, so that the regular semi-circular form is approached gradually and progresses from the center outwardly until the curvature produced by the last set 24 of the series accurately merges or meets in accord with the curves 28 formed, as hereinbefore explained, by the second set 2 of the flanging rollers.

Due to the provision of the curves 28 at an initial operation in the development of the blank, it is not necessary in the final trough-forming operation that the dies or rollers by which the latter is performed shall so closely approach the beads as would otherwise be required, and it is rendered possible to produce contiguous to the beads the degree of curvature which is requisite in a perfectly shaped trough and which, because of the resiliency of the metal of the blank, is not obtainable in a machine designed to produce bead-skirting curves as a final operation.

What is claimed is—

1. An eaves trough forming machine comprising dies arranged in a plurality of series for performing a succession of shaping operations upon a sheet metal blank, one of said series operating to form marginal flanges disposed at right angles to the plane of the body of the blank, a second series operating upon said marginal flanges to form lateral beads, and a third series operating to gradually bend the body of the blank into trough shape, said third series consisting of a plurality of sets of coöperating rollers of which the upper rollers have their blank-engaging surfaces progressively increasing in width.

2. An eaves trough forming machine comprising dies arranged in a plurality of series for performing a succession of shaping operations upon a sheet metal blank, one of said series operating to form marginal flanges disposed at right angles to the plane of the body of the blank, a second series operating upon said marginal flanges to form lateral beads, and a third series operating to gradually bend the body of the blank into trough shape, said third series consisting of a plurality of sets of coöperating rollers, the blank-contacting surface of the upper roller of the first set having a relatively narrow width and succeeding upper rollers of said sets having their blank-contacting surfaces progressively increasing in width.

3. An eaves trough forming machine comprising dies arranged in a plurality of series for performing a succession of shaping operations upon a sheet metal blank, one of said series operating to form marginal flanges disposed at right angles to the plane of the body of the blank, a second series operating upon said marginal flanges to form lateral beads, and a third series operating to gradually bend the body of the blank into trough shape, said third series consisting of a plurality of sets of coöperating rollers of which the upper rollers progressively increase in width and the lower rollers progressively decrease in width.

4. In an eaves trough forming machine, a series of sets of coöperating rollers for gradually drawing the body of a blank into trough shape, an initially acting set of said rollers having the upper roller thereof shaped to act upon a relatively small area of the blank midway between the edges of the latter, and succeeding sets of the rollers having the upper rollers thereof shaped to act upon the blank in areas of progressively increasing width.

5. In an eaves trough forming machine, a series of sets of coöperating rollers for gradually drawing the body of a blank into trough shape, an initially acting set of said rollers having the upper roller thereof of relatively narrow width for acting upon the blank remote from the edges of the latter, and succeeding sets of rollers having the upper rollers thereof progressively increasing in width for operating upon the blank at progressively decreasing distances from the edges of the latter.

6. In an eaves trough forming machine, a series of sets of coöperating rollers for gradually drawing the body of a blank into trough shape, the lower rollers of said sets progressively decreasing in width to correspond with the decreasing width of the blank resulting from the drawing of the latter, and the upper rollers successively operating medially upon said blank in areas of progressively increasing width.

7. An eaves trough forming machine comprising dies arranged in a plurality of series for performing a succession of shaping operations upon a sheet metal blank, one of said series operating to form marginal flanges disposed at right angles to the plane of the body of the blank and also operating to form initial trough-shaping curves, in said body contiguous to the bends produced in forming said flanges, a second series operating upon said marginal flanges to form lateral beads, and a third series operating progressively to complete the curving of said body into trough shape.

8. An eaves trough forming machine comprising dies arranged in a plurality of series for performing a succession of shaping operations upon a sheet metal blank, one of said series operating to form marginal flanges disposed at right angles to the plane of the body of the blank, certain of the dies of said one series operating to impart preliminary trough-shaping curves in said body contiguous to the bends produced in forming said flanges, a second series operating upon said marginal flanges to form lateral beads, and a third series operating upon said body to produce a trough-shaped curvature supplementing the said preliminary curves.

9. An eaves trough forming machine comprising dies arranged in a plurality of series for performing a succession of shaping operations upon a sheet metal blank, one of said series operating to form marginal flanges disposed at right angles to the plane of the body of the blank, certain of the dies of said one series operating to impart preliminary trough-shaping curves in said body contiguous to the bends produced in forming said flanges, a second series operating upon said marginal flanges to form lateral beads, and a third series operating to complete the curving of said body into trough shape, said third series of dies consisting of a plurality of sets of rollers of which an initially acting set has the upper roller shaped to operate upon a relatively narrow area of said body midway between said beads, and succeeding sets have the upper rollers thereof shaped to operate upon said body in areas of progressively increasing width.

10. An eaves trough forming machine comprising dies arranged in a plurality of series for performing a succession of shaping operations upon a sheet metal blank, one of said series operating to form marginal flanges disposed at right angles to the plane of the body of the blank, certain of the dies of said one series operating to impart preliminary trough-shaping curves in said body contiguous to the bends produced in forming said flanges, a second series operating upon said marginal flanges to form lateral beads, and a third series operating upon said body to produce a trough-shaped curvature supplementing the said preliminary curves, said third series consisting of a plurality of sets of coöperating rollers of which an initially acting set has the upper roller thereof presenting to said body remote from the beads a relatively narrow arc-shaped periphery, and succeeding sets have the upper rollers thereof of progressively increasing peripheral width whereby body areas of progressively increasing width are acted upon.

In testimony whereof I affix my signature.

MARTIN L. HUNKER.